(12) United States Patent
Brunetto et al.

(10) Patent No.: US 9,776,258 B2
(45) Date of Patent: Oct. 3, 2017

(54) DOUBLE-SIDED, TRIGON CUTTING INSERT WITH ROUNDED MINOR CUTTING EDGE AND CUTTING TOOL THEREFOR

(71) Applicant: Kennametal Inc., Latrobe, PA (US)

(72) Inventors: Lance David Brunetto, Greensburg, PA (US); Brad Daniel Hoffer, White, PA (US)

(73) Assignee: KENNAMETAL INC., Latrobe, PA (US)

( * ) Notice: Subject to any disclaimer, the term of this patent is extended or adjusted under 35 U.S.C. 154(b) by 233 days.

(21) Appl. No.: 14/637,846

(22) Filed: Mar. 4, 2015

(65) Prior Publication Data

US 2016/0256941 A1 Sep. 8, 2016

(51) Int. Cl.
*B23C 5/06* (2006.01)
*B23C 5/20* (2006.01)

(52) U.S. Cl.
CPC .............. *B23C 5/207* (2013.01); *B23C 5/06* (2013.01); *B23C 2200/0411* (2013.01); *B23C 2200/205* (2013.01); *B23C 2200/208* (2013.01); *B23C 2220/28* (2013.01); *Y10T 407/23* (2015.01); *Y10T 407/235* (2015.01)

(58) Field of Classification Search
CPC ....... B23C 2200/0411; B23C 2200/205; B23C 2200/208; B23C 2200/28; B23C 5/06; B23C 5/207; B23C 2210/082; Y10T 407/23; Y10T 407/235
See application file for complete search history.

(56) References Cited

U.S. PATENT DOCUMENTS

| 4,755,086 A | * | 7/1988 | Stashko | ............... B23B 27/145 407/114 |
| 5,207,538 A | * | 5/1993 | Satran | .................. B23C 5/2213 407/113 |
| 5,382,118 A | | 1/1995 | Satran et al. | |
| 5,597,271 A | | 1/1997 | Men et al. | |
| 5,971,672 A | | 10/1999 | Hansson | |

(Continued)

FOREIGN PATENT DOCUMENTS

| DE | 19702182 A1 | * | 7/1998 | ........... B23B 27/141 |
| DE | 202011050704 U1 | * | 10/2012 | ............... B23C 5/06 |

(Continued)

*Primary Examiner* — Daniel Howell
*Assistant Examiner* — Nicole N Ramos
(74) *Attorney, Agent, or Firm* — Matthew S. Bedsole

(57) ABSTRACT

A double-sided, trigon cutting insert has three three major cutting edges formed at an intersection between a first planar side surface portion and first and second surfaces, and three minor cutting edges formed at an intersection between a second planar side surface portion and first and second surfaces. A planar rake surface extends radially inward and downward from each major cutting edge, and a rounded rake surface extends radially inward and downward from each minor cutting edge. An insert-receiving pocket of a cutting tool includes a planar bottom support surface, a first planar side support surface, a second planar side support surface, and a third planar side support surface. Each rounded rake surface is formed with a radius, R, that causes only a high point of each minor cutting edge to contact a workpiece during a machining operation.

15 Claims, 6 Drawing Sheets

(56) References Cited

U.S. PATENT DOCUMENTS

| | | | |
|---|---|---|---|
| 6,530,726 B2* | 3/2003 | Nelson | B23C 5/202 |
| | | | 407/114 |
| 6,540,447 B2* | 4/2003 | Nagata | B23C 5/2221 |
| | | | 407/114 |
| 7,513,717 B2* | 4/2009 | Engstrom | B23C 5/202 |
| | | | 407/113 |
| 2008/0232912 A1 | 9/2008 | Bhagath | |
| 2008/0260475 A1 | 10/2008 | Bodewig | |
| 2008/0304924 A1 | 12/2008 | Engstrom et al. | |
| 2009/0285646 A1* | 11/2009 | Oprasic | B23C 5/06 |
| | | | 407/114 |
| 2012/0070242 A1* | 3/2012 | Choi | B23C 5/109 |
| | | | 407/113 |
| 2013/0108383 A1* | 5/2013 | Scheicher | B23B 27/145 |
| | | | 407/113 |
| 2013/0251464 A1* | 9/2013 | Hecht | B23C 5/06 |
| | | | 407/48 |
| 2014/0126970 A1* | 5/2014 | Maeta | B23C 5/06 |
| | | | 407/114 |
| 2014/0212229 A1* | 7/2014 | Diepold | B23C 5/202 |
| | | | 407/42 |
| 2014/0341660 A1 | 11/2014 | Cheon | |

FOREIGN PATENT DOCUMENTS

| | | | | |
|---|---|---|---|---|
| SE | WO 2008004967 A1 * | 1/2008 | | B23C 5/14 |
| WO | 2008/132757 A1 | 11/2008 | | |

\* cited by examiner

DOUBLE-SIDED, TRIGON CUTTING INSERT WITH ROUNDED MINOR CUTTING EDGE AND CUTTING TOOL THEREFOR

BACKGROUND OF THE INVENTION

The invention relates generally to cutting inserts and, more particularly, relates to a double-sided, trigon cutting insert with three major cutting edges, three rounded minor cutting edges and three planar peripheral side surface portions and a cutting tool with an insert-receiving pocket having three planar side support surfaces for supporting the three planar peripheral side surface portions.

One skilled in the art understands that a roughing operation or rough-machining operation is a machining operation that produces a rough surface on a workpiece, and that a finishing operation or finish-machining operation is a subsequent machining operation of the rough surface generated by the preceding rough-machining operation that produces a fine finish on the workpiece.

One example of a finishing cutting insert is a cutting insert having a hexagonal base body with cutting edges that are alternately designed as finishing cutting edges and roughing cutting edges. The roughing cutting edges are called major cutting edges and the finishing cutting edges are called minor cutting edges. On a surface milling cutter, several roughing inserts for rough-machining are distributed along the front-face periphery of the surface milling cutter, while several finishing inserts for finish-machining are arranged at predetermined locations.

There is also an example of an existing cutting insert with an octagonal geometry in which each of the eight lateral edges has one finishing cutting edge and one roughing cutting edge. For this purpose, the individual cutting edges are arranged at different levels, i.e., they do not lie in the same plane. For each cutting edge, an inclined cutting face is radially adjacent to the center axis of the cutting insert, so that the surface topography of the cutting insert is very complex.

When machining a workpiece with a surface milling cutter, for example, there is a problem of higher feed speeds in which the machined surface has an insufficient surface quality with bumps in the shape of an arc of a circle.

SUMMARY OF THE INVENTION

What is needed is an effective feature for improving the surface quality of a workpiece in a metal cutting machining operation. Therefore, the present invention has been developed in view of the foregoing.

In one aspect of the invention, a trigon cutting insert for machining a workpiece comprises a first surface, a second surface opposite the first surface, and three peripheral side surfaces extending entirely between the first and second surfaces. Each peripheral side surface includes a first planar side surface portion extending entirely between the first and second surfaces, and a second planar side surface portion extending entirely between the first and second surfaces. Three major cutting edges are formed at an intersection between the first planar side surface portions and the first surface. Three minor cutting edges are formed at an intersection between the second planar side surface portions and the first surface. A planar rake surface extends radially inward and downward from each major cutting edge, and a rounded rake surface extends radially inward and downward from each minor cutting edge. Each rounded rake surface is formed with a radius, R, that causes only a high point of each minor cutting edge to contact the workpiece during a machining operation.

In another aspect of the invention, a cutting tool comprises a tool body including a plurality of insert-receiving pockets. Each insert-receiving pocket includes a planar bottom support surface, a first planar side support surface, a second planar side support surface, and a third planar side support surface. A trigon cutting insert is mounted in a respective insert-receiving pocket. Each trigon cutting insert includes a first surface, a second surface opposite the first surface, and three peripheral side surfaces extending entirely between the first and second surfaces. Each peripheral side surface includes a first planar side surface portion extending entirely between the first and second surfaces, and a second planar side surface portion extending entirely between the first and second surfaces. Three major cutting edges are formed at an intersection between the first planar side surface portions and the first surface, and three minor cutting edges are formed at an intersection between the second planar side surface portions and the first surface. One of the second planar side surface portions on one of the side peripheral surfaces of the cutting insert contacts the first planar side support surface of the insert-receiving pocket. One of the first planar side surface portions on an adjacent side peripheral surface of the cutting insert contacts the second planar side support surface of the insert-receiving pocket. One of the second planar side surface portions on a different one of the peripheral side surfaces of the cutting insert contacts the third planar side support surface of the insert-receiving pocket when the cutting insert is mounted in the insert-receiving pocket.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
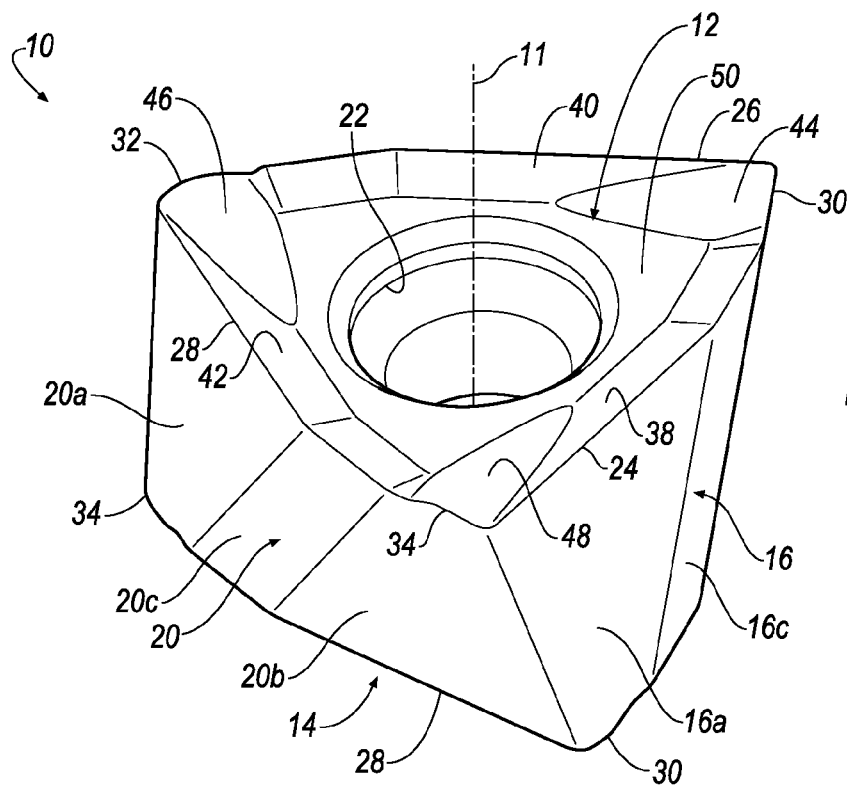
FIG. 1 is a perspective view of a cutting insert according to an aspect of the invention.

Referring to FIGS. 1-6, there is illustrated a cutting insert 10, in accordance with an aspect of the invention. In general, the cutting insert 10 is generally trigon in shape having symmetry about the z-axis 11. Thus, the cutting insert 10 can be indexed by rotating the cutting insert 10 about the z-axis to present a different cutting edge to the workpiece (not shown). In addition, the cutting insert 10 is double-sided. Thus, the cutting insert 10 can be indexed by turning the cutting insert 10 upside down such that the top surface becomes the bottom surface and vice versa.

The cutting insert 10 has substantially parallel first and second surfaces 12, 14, respectively, and peripheral side surfaces 16, 18, 20 extending entirely between the first and second surfaces 12, 14. Because the cutting insert 10 is double-sided, it should be appreciated that the terms "top" and "bottom" are relative terms and that the first surface 12 would be considered the "top" surface when exposed to the workpiece. It will also be appreciated that the first surface 12 and the second surface 14 are identical to each other. Thus, only the first surface 12 of the cutting insert will be discussed below for brevity. The cutting insert 10 also includes a countersunk bore 22 extending between the first and second surfaces 12, 14 for accommodating a mounting screw (not shown) for mounting the cutting insert 10 to a cutting tool.

The peripheral side surfaces 16, 18, 20 are substantially identical to each other. Each peripheral side surface 16, 18, 20 includes a first substantially planar side surface portion 16a, 18a, 20a extending entirely between the first and second surfaces 12, 14, a second substantially planar side surface portion 16b, 18b, 20b extending entirely between the first and second surfaces 12, 14, and a third substantially planar side surface portion 16c, 18c, 20c between the first and second substantially planar side surface portions 16a, 16b, 18a, 18b, 20a, 20b. The first and second substantially planar side surface portions 16a, 16b, 18a, 18b, 20a, 20b are generally trapezoidal in shape, while the third substantially planar side surface portions 16c, 18c, 20c are generally parallelepiped in shape. It should be noted that the third substantially planar side surface portions 16c, 18c, 20c are optional and can be omitted, and that the invention can be practiced with the peripheral side surfaces 16, 18, 20 comprising only the first and second substantially planar side surface portions 16a, 16b, 18a, 18b, 20a, 20b.

The cutting insert 10 has three major cutting edges 24, 26, 28 formed at the intersection between the first substantially planar side surface portions 16a, 18a, 20a and the first surface 12, and three minor cutting edges 30, 32, 34 formed at the intersection between the second substantially planar side surface portions 16b, 18b, 20b and the first surface 12. The major cutting edges 24, 26, 28 act as roughing cutting edges, while the minor cutting edges 30, 32, 34 act as finishing cutting edges during a machining operation. It should be appreciated that the cutting insert 10 also includes three major cutting edges and three minor cutting edges at the intersection between each of the first and second substantially planar side surface portions 16a, 16b, 18a, 18b, 20a, 20b and the second surface 14. In other words, a major cutting edge 24, 26, 28 is formed at an intersection of each of the second planar side surface portions 16b, 18b, 20b with the second, opposite surface 14, and a minor cutting edge 30, 32, 34 is formed at an intersection of each of the first planar side surface portions 16a, 18a, 20a with the second, opposite surface 14. In other words, the base of the trapezoidal shaped substantially planar surfaces 16a, 16b, 18a, 18b, 20a, 20b form the major and minor cutting edges 24, 26, 28, 30, 32, 34 of the cutting insert 10.

Figure 5:
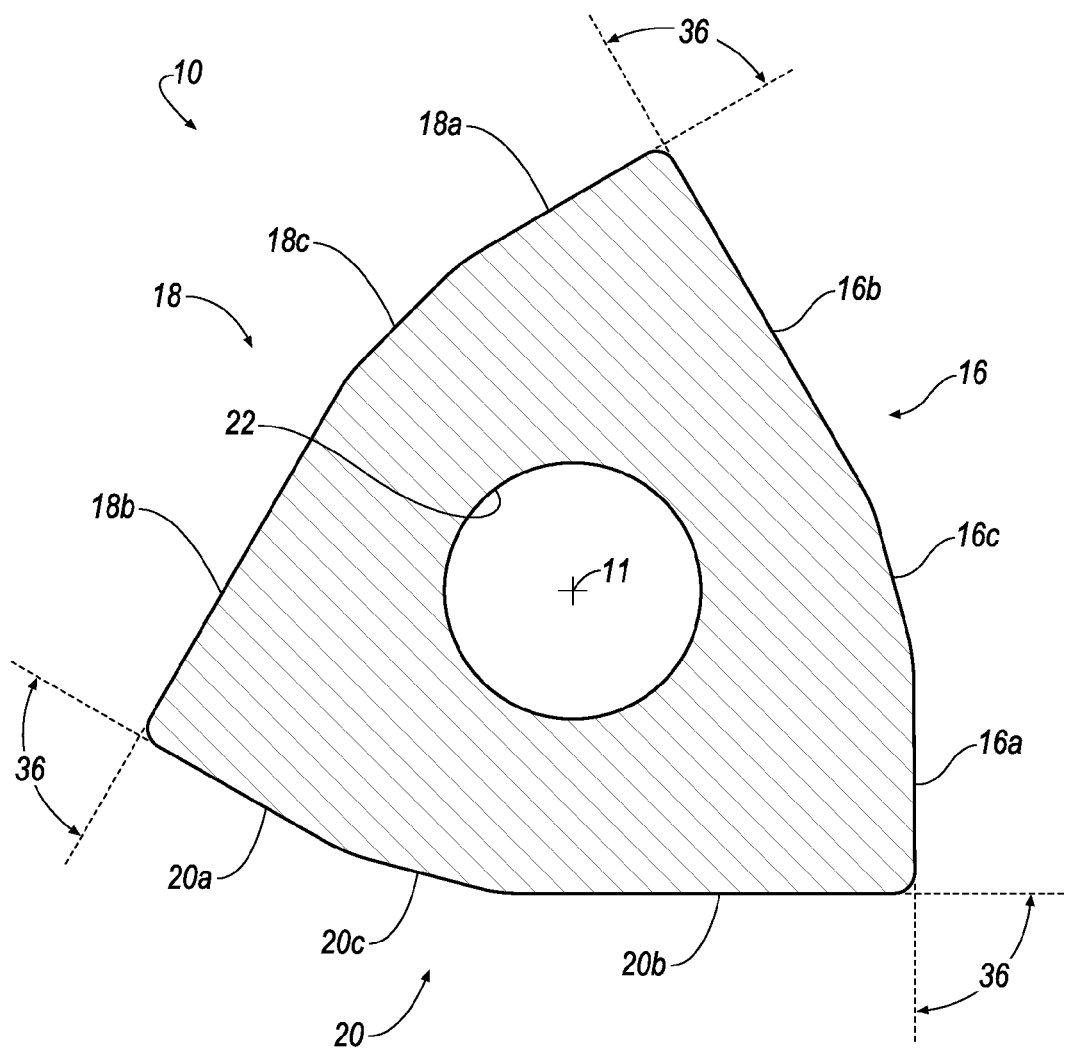
FIG. 5 is a cross-sectional view of the cutting insert taken along line 5-5 of FIG. 4.

Referring now to FIG. 5, each of the first substantially planar side surface portions 16a, 18a, 20a of the peripheral side surfaces 16, 18, 20 form an angle 36 of approximately ninety (90) degrees with respect to the second substantially planar side surface portions 16b, 18b, 20b of an adjacent peripheral side surface 16, 18, 20. For example, the first substantially planar side surface portion 16a of the peripheral side surface 16 forms an angle 36 of approximately ninety (90) degrees with the second substantially planar side surface portion 20b of the adjacent peripheral side surface 20. This feature allows for a true ninety (90) degree shoulder to be cut in a workpiece 200 (FIG. 9).

Figure 2:
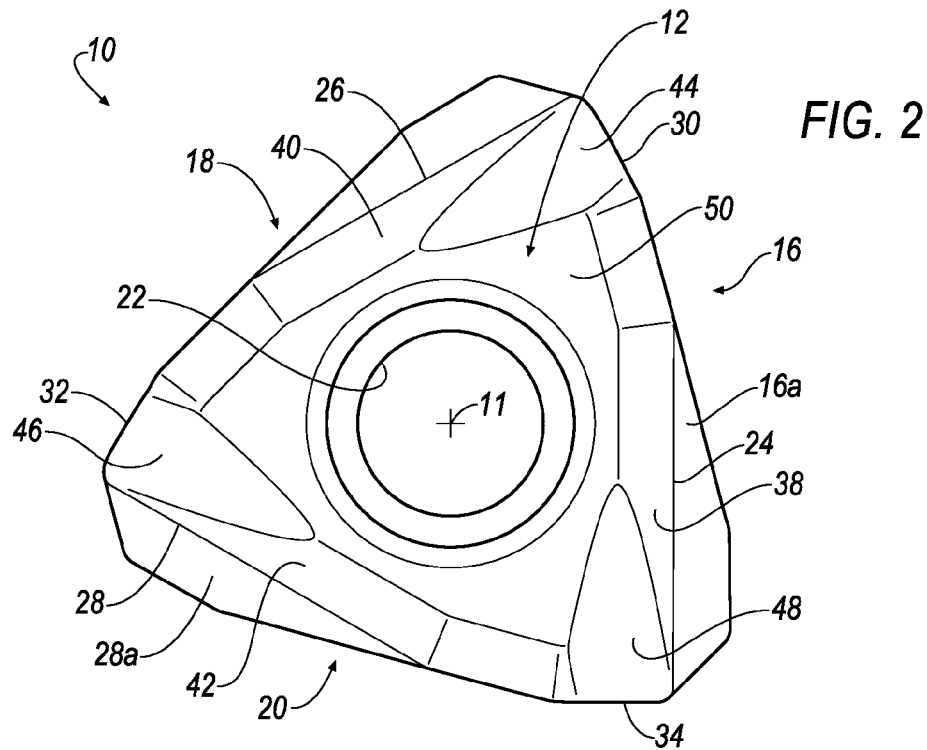
FIG. 2 is a top perspective view of the cutting insert of FIG. 1.
Figure 3:
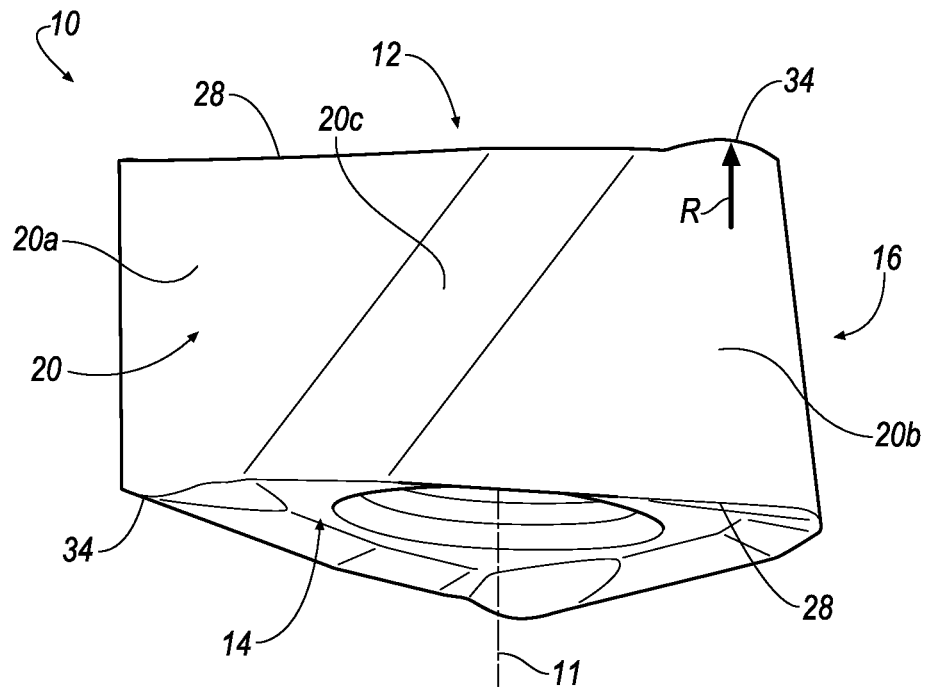
FIG. 3 is a bottom perspective view of the cutting insert of FIG. 1.

As shown in FIGS. 1 and 2, a substantially planar rake surface 38, 40, 42 extends radially inward and downward from each major cutting edge 24, 26, 28, respectively. In addition, a rounded rake surface 44, 46, 48 extends radially inward and downward from each minor cutting edge 30, 32, 34, respectively. Each rake surface 38, 40, 42, 44, 46, 48 extends from its respective cutting edge to a substantially planar seating surface 50 disposed about the countersunk bore 22.

Figure 4:
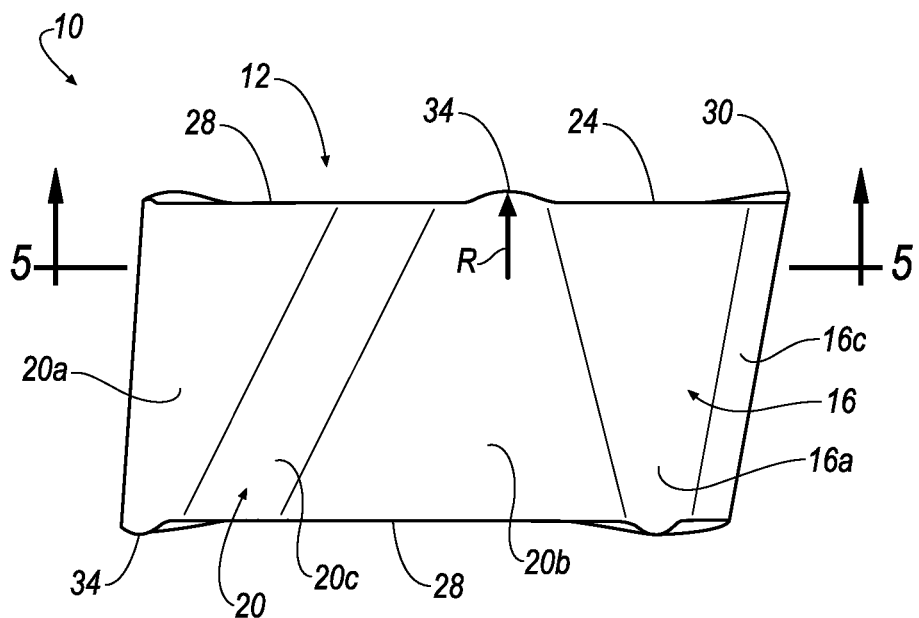
FIG. 4 is an elevational view of the cutting insert of FIG. 1.
Figure 10:
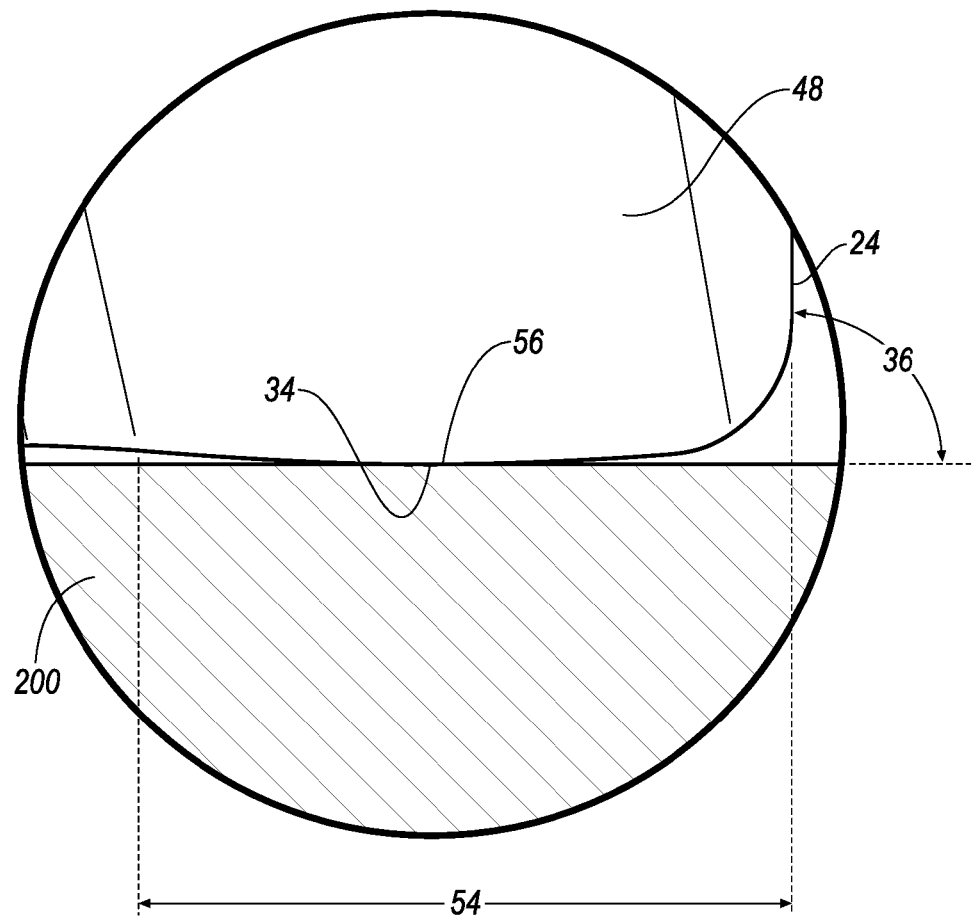
FIG. 10 is an enlarged view of the high point of the minor cutting edge of the cutting insert engaging the workpiece of FIG. 9.

In one aspect, the substantially planar surface 16b, 18b 20b and the rounded rake surface 42, 46, 48 causes each of the minor cutting edges 30, 32, 34 to be formed with a radius, R. As a result, each minor cutting edge 30, 32, 34 has a high point 56 (FIG. 10) at approximately the middle of the minor cutting edge 30, 32, 34 that is a slightly higher in elevation as compared to the remainder of the minor cutting edge 30, 32, 34, as shown in FIG. 4. The magnitude of the radius, R, can be selectively adjusted to provide a wiper cutting edge and improve the surface finish of the workpiece 200 (FIG. 10).

Figure 7:
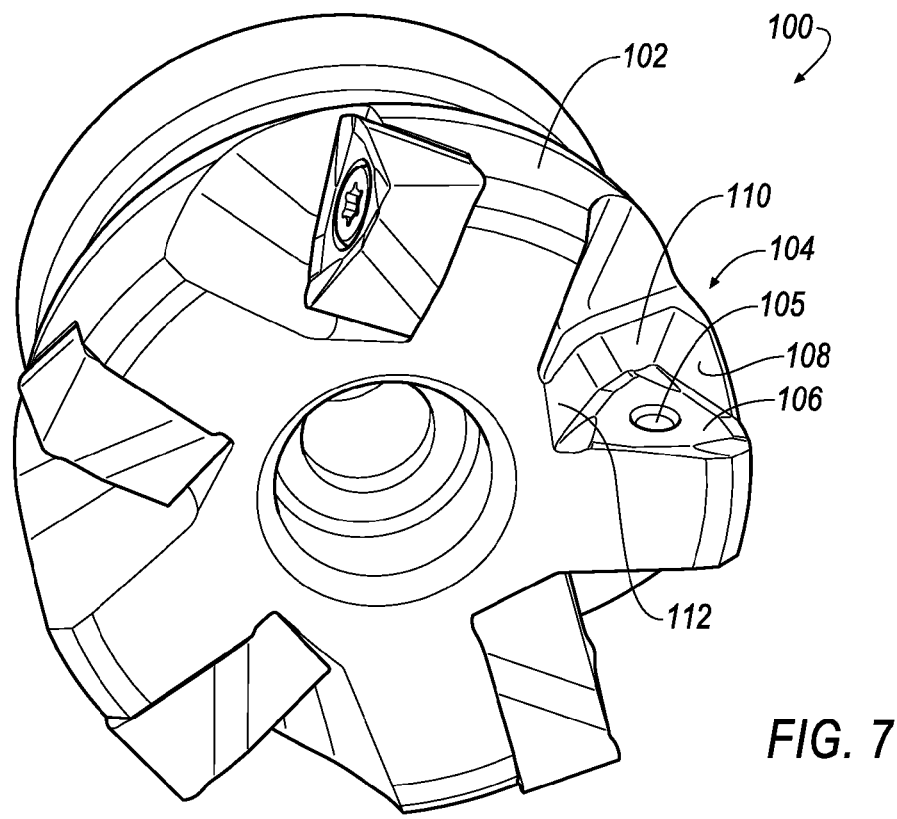
FIG. 7 is an end view of a cutting tool and insert-receiving pocket according to an aspect of the invention.
Figure 8:
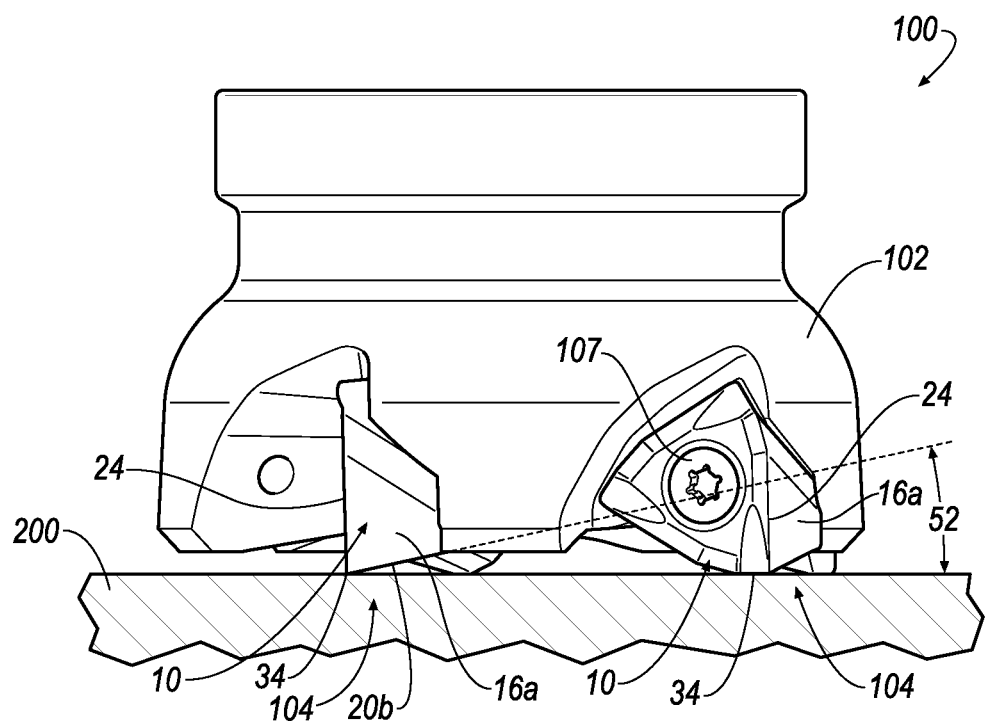
FIG. 8 is an elevational view of the cutting tool of FIG. 7 showing the cutting insert mounted with a negative axial rake angle.
Figure 9:
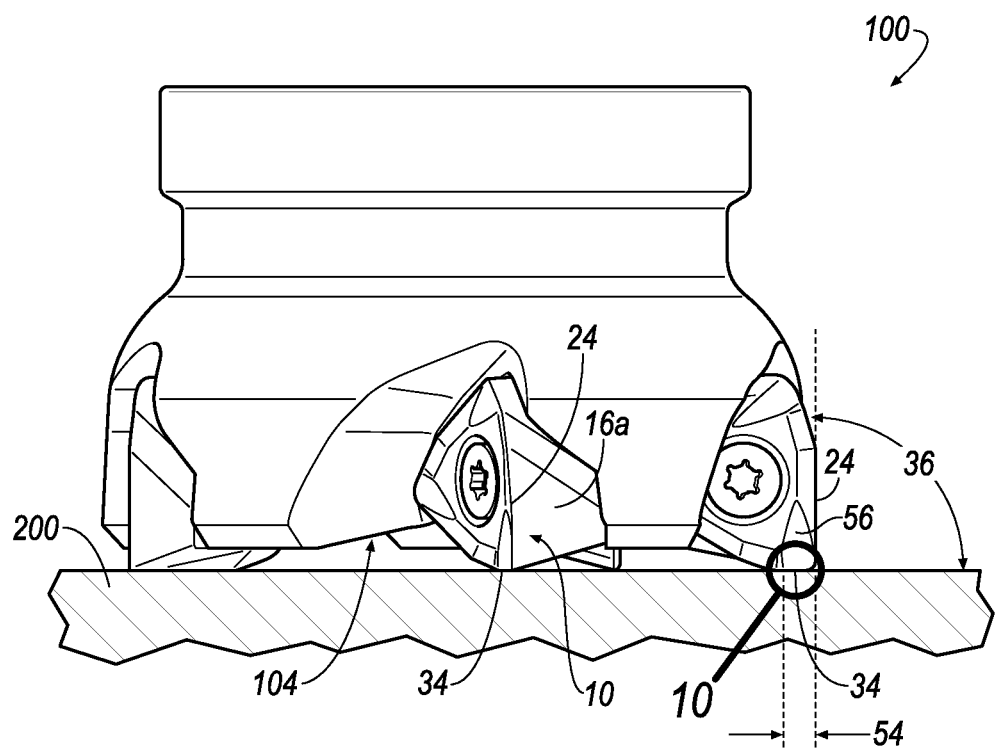
FIG. 9 is another elevational view of the cutting tool of FIG. 7 showing the cutting insert engaging a workpiece.

Referring to FIGS. 7-9, a cutting tool 100 is shown according to an embodiment of the invention. The cutting tool 100 includes a tool body 102 with a plurality of insert-receiving pockets 104 for removably mounting a plurality of the cutting inserts 10 to the tool body 102. As shown in FIG. 7, each insert-receiving pocket 104 includes a central opening 105 that is capable of receiving a mounting screw 107 (FIG. 8) for mounting the cutting insert 10 in the insert-receiving pocket 104. Each insert-receiving pocket 104 includes a substantially planar bottom support surface 106 for supporting the substantially planar seating surface 50 of the cutting insert 10. In addition, each insert-receiving pocket 104 includes a first substantially planar side support surface 108, a second substantially planar side support surface 110, and a third substantially planar side support surface 112.

The first substantially planar side support surface 108 of the insert-receiving pocket 104 is substantially trapezoidal in shape and contacts the second substantially planar side surface 16b, 18b, 20b of the cutting insert 10. The second substantially planar side support surface 110 of the insert-receiving pocket 104 is substantially trapezoidal in shape and contacts the first substantially planar side surface 16a, 18a, 20a on an adjacent peripheral side surface 16, 18, 20 of the cutting insert 10. The third substantially planar side support surface 112 of the insert-receiving pocket 104 is substantially trapezoidal in shape and contacts the second substantially planar side surface 16b, 18b, 20b on the same peripheral side surface as the first substantially planar side surface 16a, 18a, 20a of the cutting insert 10.

Figure 6:
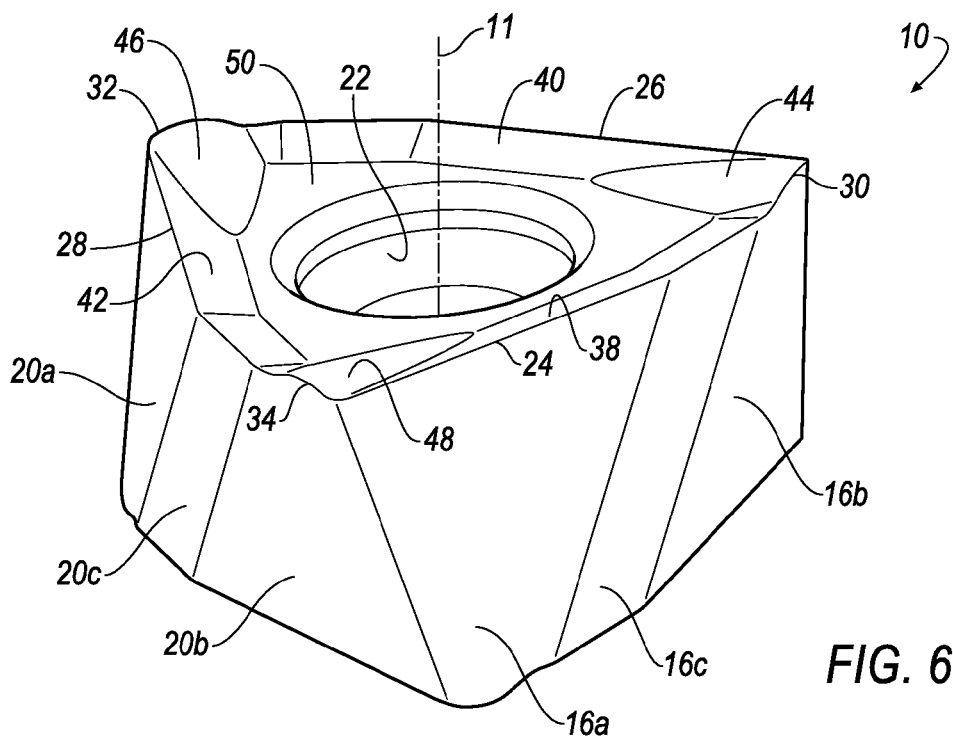
FIG. 6 is another perspective view of the cutting insert of FIG. 1.

As shown in FIGS. 6 and 7, for example, the second substantially planar side surface portion 20b of the cutting insert 10 contacts the first substantially planar side support surface 108 of the insert-receiving pocket 104 when the cutting insert 10 is mounted in the insert-receiving pocket 104. In addition, the first substantially planar side surface portion 16a on an adjacent side peripheral surface 16 of the cutting insert 10 contacts the second substantially planar side support surface 110 when the cutting insert 10 is mounted in the insert-receiving pocket 104. Further, the second substantially planar side surface portion 16b on a different one of the peripheral side surfaces 16, 18, 20 of the cutting insert 10 contacts the third substantially planar side support surface 112 when the cutting insert 10 is mounted in the insert-receiving pocket 104.

As mentioned earlier, each of the first substantially planar side surface portions 16a, 18a, 20a of the peripheral side surfaces 16, 18, 20 of the cutting insert 10 form an angle 36 of approximately ninety (90) degrees with respect to the second substantially planar side surface portions 16b, 18b, 20b of an adjacent peripheral side surface 16, 18, 20. Thus, the second substantially planar side support surface 110 of the insert-receiving pocket 104 is formed at the angle 36 of approximately ninety (90) degrees with respect to the third substantially planar side support surface 112 of the insert-receiving pocket 104.

Another aspect of the invention is that the second substantially planar side surface 16b, 18b, 20b of the cutting insert 10 provides a flat abutment surface on the opposite side of the cutting insert 10 when the cutting insert 10 is mounted in the insert-receiving pocket 104, thereby providing four-point contact between the cutting insert 10 and the insert-receiving pocket 104. As a result, the cutting insert 10 is firmly secured within the insert-receiving pocket 104.

As shown in FIG. 8, each cutting insert 10 is mounted in a respective insert-receiving pocket 104 at a negative axial rake angle 52 of between about five (5) degrees and about fifteen (15) degrees. As a result, a clearance is provided between the second substantially planar side surface 16b, 18b, 20b of the cutting insert 10 and the workpiece 200 when the cutting insert 10 is mounted in the insert-receiving pocket 104.

Referring now to FIGS. 9 and 10, the radius, R, of the minor cutting edges 30, 32, 34 causes only the high point of the minor cutting edges 30, 32, 34 to contact the workpiece 200. In other words, the entire width 54 of the minor cutting edges 30, 32, 34 does not contact the workpiece 200, but only at the high point 56. Thus, the mounting of the cutting insert 10 with a negative axial rake angle 52 and the selectively adjusting the magnitude of the radius, R, of the minor cutting edges 30, 32, 34 enable the minor cutting edges 30, 32, 34 to act as a wiper cutting edge to improve the surface finish on the workpiece 200.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A trigon cutting insert for machining a workpiece, comprising:
    a first surface;
    a second surface opposite the first surface;
    three peripheral side surfaces extending entirely between the first and second surfaces, each peripheral side surface including a first planar side surface portion extending entirely between the first and second surfaces, and a second planar side surface portion extending entirely between the first and second surfaces;
    three major cutting edges formed at an intersection between the first planar side surface portions and the first surface;
    three minor cutting edges formed at an intersection between the second planar side surface portions and the first surface;
    a planar rake surface extending radially inward and downward from each major cutting edge; and
    a rounded rake surface extending radially inward and downward from each minor cutting edge,
    wherein each rounded rake surface is formed with a radius, R, that causes only a high point of each minor cutting edge to contact the workpiece during a machining operation.

2. The cutting insert of claim 1, wherein each planar rake surface extends from a respective major cutting edge to a planar seating surface disposed about a countersunk bore, and wherein each rounded rake surface extends from a respective minor cutting edge to the planar seating surface disposed about the countersunk bore.

3. The cutting insert of claim 1, wherein the peripheral side surfaces extend entirely between the first and second surfaces.

4. The cutting insert of claim 1, wherein each first planar side surface portion and each second planar side surface portion are trapezoidal in shape.

5. The cutting insert of claim 1, wherein each peripheral side surface further comprises a third planar side surface portion extending between the first and second planar side surface portions.

6. The cutting insert of claim 5, wherein each third planar side surface portion is parallelepiped is shape.

7. The cutting insert of claim 1, wherein the cutting insert is mounted in an insert-receiving pocket of a cutting tool at a negative axial rake angle to provide a clearance between the second planar side surface portion of the cutting insert and a workpiece.

8. The cutting insert of claim 1, wherein a major cutting edge is formed at an intersection of each of the second planar side surface portions with the second, opposite surface, and wherein a minor cutting edge is formed at an intersection of each of the first planar side surface portions with the second, opposite surface.

9. The cutting insert of claim 1, wherein the first planar side surface portion of at least one of the peripheral side surfaces form an angle of approximately ninety degrees with respect to the second planar side surface portion of an adjacent peripheral side surface.

10. A cutting tool, comprising:
    a tool body including a plurality of insert-receiving pockets, each insert-receiving pocket including a planar bottom support surface, a first planar side support surface, a second planar side support surface, and a third planar side support surface; and
    a trigon cutting insert mounted in a respective insert-receiving pocket, each trigon cutting insert including:
    a first surface;
    a second surface opposite the first surface;
    three peripheral side surfaces extending entirely between the first and second surfaces, each peripheral side surface including a first planar side surface portion extending entirely between the first and second surfaces;
    a second planar side surface portion extending entirely between the first and second surfaces;
    three major cutting edges formed at an intersection between the first planar side surface portions and the first surface;

three minor cutting edges formed at an intersection between the second planar side surface portions and the first surface;

a planar rake surface extending radially inward and downward from each major cutting edge; and a rounded rake surface extending radially inward and downward from each minor cutting edge, wherein one of the second planar side surface portions on one of the side peripheral surfaces of the cutting insert contacts the first planar side support surface of the insert-receiving pocket, and wherein one of the first planar side surface portions on an adjacent side peripheral surface of the cutting insert contacts the second planar side support surface of the insert-receiving pocket, and wherein one of the second planar side surface portions on a different one of the peripheral side surfaces of the cutting insert contacts the third planar side support surface of the insert-receiving pocket when the cutting insert is mounted in the insert-receiving pocket; and wherein each rounded rake surface is formed with a radius, R, that causes only a high point of each minor cutting edge to contact the workpiece during a machining operation.

11. The cutting tool of claim 10, wherein the cutting insert further comprises a planar rake surface extending radially inward and downward from each major cutting edge; and a rounded rake surface extending radially inward and downward from each minor cutting edge, wherein each rounded rake surface is formed with a radius, R, that causes only a high point of each minor cutting edge to contact a workpiece during a machining operation.

12. The cutting tool of claim 10, wherein each planar rake surface of the cutting insert extends from a respective major cutting edge to a planar seating surface disposed about a countersunk bore, and wherein each rounded rake surface extends from a respective minor cutting edge to the planar seating surface disposed about the countersunk bore.

13. The cutting tool of claim 12, wherein the planar seating surface of the cutting insert contacts a planar bottom support surface of the insert-receiving pocket when the cutting insert is mounted in the insert-receiving pocket.

14. The cutting tool of claim 10, wherein the second planar side support surface of the insert-receiving pocket is formed at the angle of approximately ninety degrees with respect to the third planar side support surface of the insert-receiving pocket.

15. The cutting tool of claim 10, wherein the cutting insert is mounted in an insert-receiving pocket of a cutting tool at a negative axial rake angle to provide a clearance between the cutting insert and a workpiece.

\* \* \* \* \*